United States Patent [19]

Roggero et al.

[11] Patent Number: 4,797,451

[45] Date of Patent: Jan. 10, 1989

[54] SOLID POLYMERIC STABILIZER COMPOUNDS AND PROCESS FOR THEIR MANUFACTURE

[75] Inventors: Arnaldo Roggero, San Donato Milanese; Guglielmo Bertolini, Pavia; Carlo Busetto, Milan, all of Italy

[73] Assignee: Eniricerche S.p.A., Milan, Italy

[21] Appl. No.: 910,885

[22] Filed: Sep. 24, 1986

[30] Foreign Application Priority Data

Oct. 9, 1985 [IT] Italy ................................ 22408 A/85

[51] Int. Cl.$^4$ ........................... C08F 8/42; C08F 65/00
[52] U.S. Cl. ............................. 525/332.9; 525/333.1; 525/333.3; 525/333.6; 525/360; 525/390; 525/397; 525/420; 525/436; 525/437; 525/453; 525/462; 525/523; 525/533; 525/534; 525/535
[58] Field of Search ............... 525/279, 366, 375, 130, 525/135, 99, 390, 397, 453, 523, 533, 534, 535, 333.1, 332.9, 333.3, 333.6, 360, 420, 436, 437, 462

[56] References Cited

U.S. PATENT DOCUMENTS

| | | | |
|---|---|---|---|
| 4,314,933 | 2/1982 | Berner | 525/279 |
| 4,356,287 | 10/1982 | Loffelman et al. | 524/99 |
| 4,369,274 | 1/1983 | Thomas | 524/99 |
| 4,370,430 | 1/1983 | Hoffman | 524/99 |
| 4,402,843 | 9/1983 | Trepka | 525/366 |
| 4,520,171 | 5/1985 | Dixely et al. | 525/375 |
| 4,594,395 | 6/1986 | Bezoari | 525/366 |
| 4,596,859 | 6/1986 | Bezoari | 525/366 |

*Primary Examiner*—Allan Lieberman
*Attorney, Agent, or Firm*—Hedman, Gibson, Costigan & Hoare

[57] ABSTRACT

Solid polymeric stabilizer compounds are disclosed comprising an organic polymeric matrix, to which are linked groups containing a sterically hindered aminic function, the organic polymeric matrix being a polymeric matrix of a vinyl-aromatic, aromatic with heteroatoms, dienic or olefinic polymer, containing hydrogen atoms replaceable by metal atoms, the groups containing the sterically hindered aminic function replacing, at least partially, said replaceable-by-metal hydrogen atoms of the matrix.

Also disclosed are processes for the preparation of said solid polymeric stabilizers and stabilized polymeric compositions comprising an organic polymer and a stabilizing amount of said solid polymeric stabilizers.

13 Claims, 1 Drawing Sheet

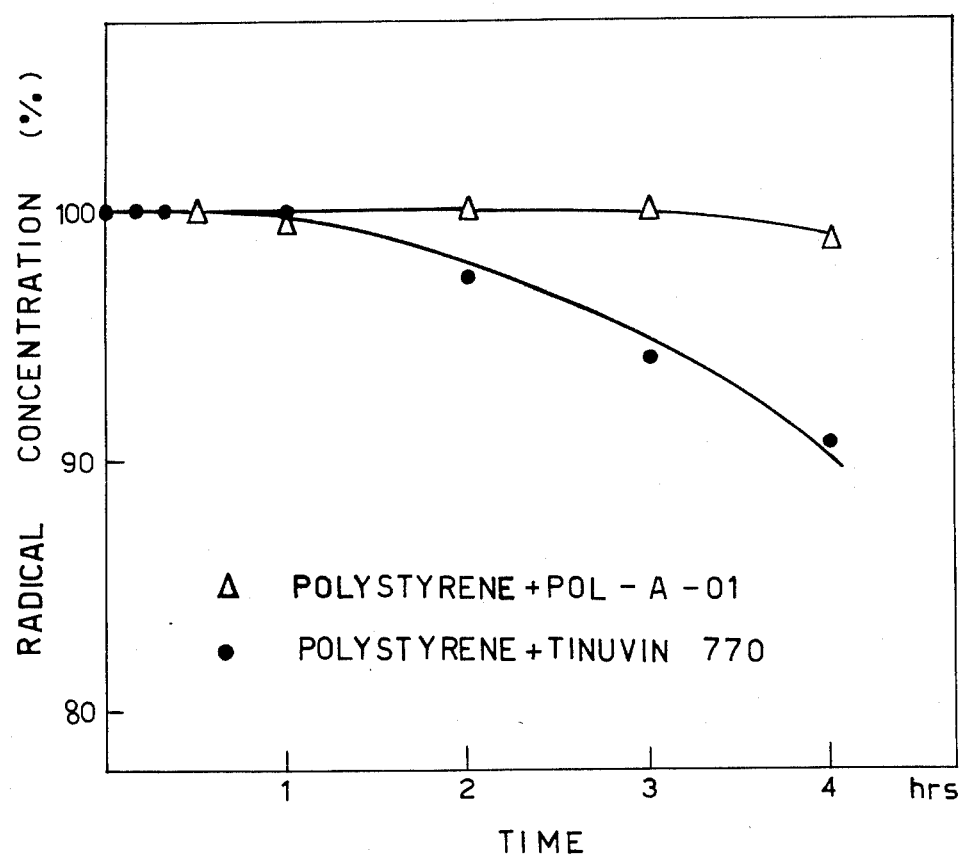

SOLID POLYMERIC STABILIZER COMPOUNDS AND PROCESS FOR THEIR MANUFACTURE

The present invention relates to solid polymeric stabilizer compounds, to the processes for preparing them and to the stabilized polymeric compositions comprising an organic polymer and a stabilizing amount of said solid polymeric stabilizer compounds.

It is known that organic polymers such as polystyrene, polyolefins and polydienes undergo degradation over time because of the effect of their exposure to the atmospheric agents, in particular U.V. light. This degradation leads to a decay of the physical characteristics of the polymers, such as, e.g., the lowering of the ultimate tensile strength and of the flexibility, which are accompanied by a change in viscosity index.

In order to counteract such a degradation, it is known to introduce into the organic polymers small amounts of stabilizer compounds, generally including phenols or by sterically hindered amines. Accordingly, as stabilizers for organic polymers, some derivatives of pyrrolidine (U.S. Pat. Nos. 4,325,864 and 4,346,188) and some derivatives of tetramethylmorpholine or of pentamethylmorpholine (U.S. Pat. No. 4,617,333) have been disclosed.

Problems which arise in the stabilization of the organic polymers derive essentially from incompatibility between the organic polymer and the stabilizer, and from release of the stabilizer by the same polymer. When the stabilization is carried out by the stabilizer agents of the prior art, these undesirable problems occur to different extents, and consequently there is a need for stabilizer compounds compatible with the organic polymers and capable of being retained more stably inside the same polymers.

One solution to these problems is disclosed in the U.S. Pat. No. 4,684,726, which discloses stabilizer compounds containing a sterically hindered aminic group and a hydrolysable silyl function in the same molecule. These stabilizer compounds hydrolyse at the silyl function, or are made to interact with an inorganic solid support containing superficial hydroxy groups, or are reacted with an organic polymer provided with ethylenic unsaturation, in all cases giving rise to complex structures which remain inside the organic polymer into which they are incorporated, and which show more stability than conventional sterically hindered amines.

But it has been observed that the stabilizer compounds containing a sterically hindered aminic group and a silyl function in the same molecule are poorly reactive towards supports, in particular polymeric supports, so that linking an adequate amount of the stabilizer to the support proves difficult. Moreover, the complex structures disclosed in the aforementioned U.S. Pat. No. 4,684,726 are often not completely satisfactory in terms of their homogeneity with the organic polymers and their compatibility with the same polymers.

The purpose of the present invention is therefore to overcome the aforementioned drawbacks of the known art.

The present invention is essentially based on the observation that the products obtained by introducing metal atoms into organic polymers bearing hydrogen atoms replaceable by metal atoms are readily reacted with the sterically hindered aminic compounds bearing in their molecule a reactive electrophilic function, in particular a carbonyl function, and that the product derived from this reaction can be obtained in a solid and subdivided form, easily homogenizable with the organic polymers.

Accordingly, it is now possible to produce, in a simple and convenient way, solid polymeric stabilizer compounds containing the desired amount of active nitrogen, in a physical form which is easily homogenized with the organic polymers, and which compounds on one hand retain unchanged the stabilizer characteristics peculiar to sterically hindered amines, and on the other hand display extremely high compatibility and permanence inside the organic polymers.

Accordingly, the solid polymeric stabilizer compounds of the present invention comprise an organic polymeric matrix to which are linked groups containing a sterically hindered aminic function, wherein the organic polymeric matrix is a vinyl-aromatic, aromatic ether, dienic or olefinic polymeric matrix containing hydrogen atoms replaceable by metal atoms, and wherein at least part of the replaceable hydrogen atoms of the polymer are replaced by said groups containing the sterically hindered aminic function. The polymeric stabilizer compounds will furthermore have a molecular weight of from about 1000 to about 100,000 and a content of active nitrogen of at least 0.14% by weight.

A preferred process for the preparation of the solid polymeric stabilizer compounds of the present invention comprises the following steps carried out sequentially:

dissolution, in an inert organic solvent, of a vinyl-aromatic, aromatic ether, dienic or olefinic polymer, containing hydrogen atoms replaceable by metal atoms;

at least partial replacement with metal atoms of the replaceable-by-metal hydrogen atoms of said vinyl-aromatic, aromatic ether, dienic or olefinic polymer by reaction with a metal-introducing agent;

reaction of the vinyl-aromatic, aromatic ether, dienic or olefinic polymer into which metal atoms have thus been introduced, with a compound bearing a sterically hindered aminic function and an electrophilic function, in particular a carbonyl function, to form the polymeric stabilizer compound;

separation of the said polymeric stabilizer compound from the reaction mixture of the preceding step, in the form of a subdivided solid.

A further process for the preparation of the solid polymeric stabilizer compounds of the present invention comprises the preparation of a metal-containing polymer by polymerization of vinyl-aromatic and/or dienic monomers in the presence of a lithium-alkyl catalyst, by technique of the living polymers, and subsequently the reaction of the thus obtained polymer containing metal atoms with a compound bearing a sterically hindered aminic function and an electrophilic function, such as carbonyl.

Such a product can also be employed to form a stabilized polymeric composition.

The stabilized polymeric compositions of the present invention comprise an organic polymer and such an amount of said solid polymeric stabilizer compound as to supply to the composition a concentration of active nitrogen of at least 0.005% by weight.

The organic polymers into which metal atoms can be introduced, useful for the purposes of the present invention, are the vinylaromatic, aromatic ether, dienic or olefinic polymers which contain hydrogen atoms replaceable by metal atoms in the meaning as indicated by A. J. Chalk et al., in J. Polym. Sci., A-1, 7, 691 (1969); J. C. Brusse et al., in Makromol. Chem., 183, 2193 (1982); D. P. Tate et al., in J. Polym. Sci. A-1, 9, 139 (1971); and A. J. Amass et al., in Eur. Polym. J., 8, 781 (1972).

Typical but non-limiting examples of these polymers into which metal atoms can be introduced are polymethylstyrene, e.g., poly-para-methylstyrene, poly-2,6-dimethyl-1,4-phenylene-ether, polybutadiene, polyisoprene and ethylene/propylene/diene terpolymers, such as ethylene/propylene/ethylidene-norbornene terpolymer, styrene-butadiene copolymers, random and block copolymers of vinyl-aromatic, dienic or olefinic monomers with other monomer types, e.g., alkyl-vinyl-ethers, such as the copolymer between p-methyl-styrene and octadecyl-vinyl-ether.

These polymers will have a molecular weight of the same order of magnitude as that of the polymeric solid stabilizer product desired; or it will be taken into account that during the process of introducing metal atoms, sometimes a degradation of molecular weight may occur.

The metal-atoms-introducing agents suitable for the purposes of the present invention are metal-alkyls of from 1 to 12 carbons, metal hydrides or metal amides of the alkali metals, in particular of sodium, lithium or potassium. Specific examples of such metal-atoms-introducing agents are: Li-n.butyl, Li-sec.butyl, Na-amyl, Na-cumyl, K-cumyl, Li-diisopropylamide, NaH.

These metal-atoms-introducing agents can be used in combination with typical activators of the metal-atoms-introduction reaction, such as, e.g., N,N,N',N'-tetramethylethylenediamine, potassium tert.butoxide and diazobicyclooctane.

According to the preferred process of the present invention, first a solution is prepared of the polymer into which the metal atoms are to be introduced, in an inert organic solvent. Organic solvents useful for that purpose comprise the liquid aliphatic, cycloaliphatic or aromatic hydrocarbons, such as cyclohexane and toluene, and the liquid ethers, especially the cyclic ethers, for example tetrahydrofuran.

The reaction to introduce metal atoms into the polymer is carried out by bringing into contact the polymer (into which the metal atoms are to be introduced) and the metal-atoms-introducing agent, with the possible addition of an activator for the said metal-atoms-introducing agent, in the organic solvent. The reaction is carried out at a temperature of from 0° C. to 150° C., and preferably of from 40° C. to 80° C., with reaction times generally ranging from 30 minutes to 6 hours.

Obviously, the amount of the metal-atoms-introducing agent employed in the reaction with the organic polymer varies as a function of the desired extent of the metal atoms introduction. However, normally from 0.1 to 1.0 mol of metal-atoms-introducing agent per each mol of monomeric unit of the polymer containing hydrogen atoms replaceable by metal atoms will be used.

By operating within the conditions as defined above, a metal-atoms-introduction yield is generally obtained of from 30 to 90%, calculated with reference to the metal-atoms-introducing agent used.

The best results are accomplished by using as the metal-atoms-introducing agents the lithium-alkyls, or the lithium-alkyls in combination with the above mentioned activator agents, with a molar ratio of replaceable hydrogen-containing polymeric units to metal-atoms-introducing agent generally ranging from 1/0.1 to 1/10, and preferably comprised within the range of from 1/0.5 to 1/1.

For example, when the polymer containing hydrogen atoms replaceable by metal atoms is poly-paramethylstyrene:

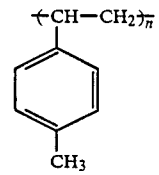

, and the metal-atoms-introduction reaction is carried out by using a lithium-alkyl in the presence of the activator N,N,N',N'-tetramethylethylenediamine, a metal-atoms-containing poly-paramethylstyrene is obtained, which can be generally represented by the formula:

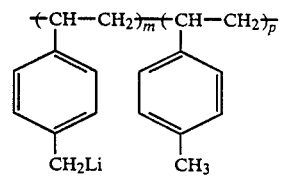

wherein $m+p=n$, and wherein the ratio of m to p depends on the ratio of the metal-atoms-introducing agent to the polymeric units containing hydrogen atoms replaceable by metal atoms.

Obviously, the polymeric units containing metal atoms will be randomly distributed in the polymeric chain and the preceding formula has been used for simplification. The possibility exists of metal atoms being introduced, to a reduced extent, on the aromatic ring and/or on the —CH— group (i.e., alpha carbons) of the styrenic chain.

It appears in any case that the extent of replacement of hydrogen atoms by metal atoms in the polymer containing replaceable hydrogen atoms can be varied within wide ranges by simply varying the ratio between the reactant species.

The sterically hindered aminic compounds useful for the purposes of the present invention are those which contain in their molecule any of the following groups: 2,2,6,6-tetramethylpiperidine:

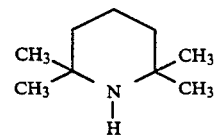

2,2,6,6-tetramethylmorpholine:

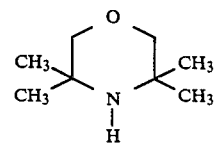

2,2,5,5-tetramethylpyrrolidine:

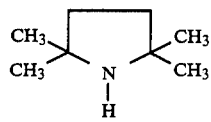

2,2,3,5,5-pentamethylpyrrolidine:

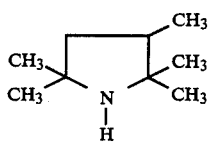

2,2,5,5-tetramethylinidazoline:

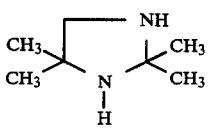

1,3,3,5,5-pentamethylpiperazine:

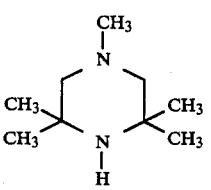

1,3,3-trimethyldecahydroquinoxaline:

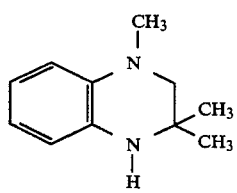

or any of a number of other compounds bearing the sterically hindered aminic group:

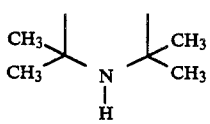

or related derivatives thereof, substituted on the nitrogen atom with an alkyl group containing from 1 to 18 carbon atoms.

Besides the above indicated aminic group, the compounds useful for the purposes of the present invention contain an electrophilic functional group, which is necessary to promote for the reaction with the organic polymer having some hydrogen atoms replaced by metal atoms. For this purpose, several electrophilic functional groups can be used, the carbonyl group being preferred.

Thus, a particularly useful sterically hindered aminic compound is 2,2,6,6-tetramethyl-4-piperidone:

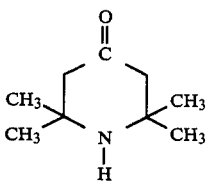

easily obtainable by reaction of acetone with ammonia.
Other useful compounds are:
3,3,5,5-tetramethylmorpholin-2-one;
1,3,3,5,5-pentamethylpiperazin-2-one;
2,2,5,5-tetramethylimidazolin-4-one;
1,3,3-trimethyldecahydroquinoxalin-2-one.

According to the process of the present invention, the metal atom-substituted organic polymer is contacted with the sterically hindered aminic compound (additionally containing an electrophilic group). The reaction is carried out with a stoichiometric or nearly stoichiometric ratio between said aminic compound and the carbanionic centres of the polymer metal atom-substituted, at a temperature of from 0° C. to 150° C. and for a period of from 30 minutes to 6 hours, to obtain the polymeric stabilizer compound of the present invention.

The preferred reaction temperatures are on the order of 40°–80° C. The reaction yields are on the order of 60–99%, calculated relative to the amount of aminic compound introduced.

In a preferred embodiment, poly-paramethylstyrene wherein some hydrogen atoms have been replaced by metal atoms is reacted with 2,2,6,6-tetramethyl-4-piperidone. A polymeric stabilizer, which can be represented by the formula:

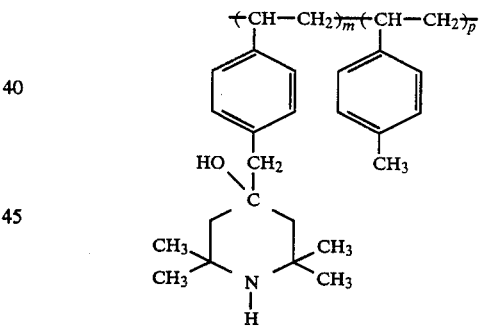

is obtained, which polymeric stabilizer may also contain units having the structure:

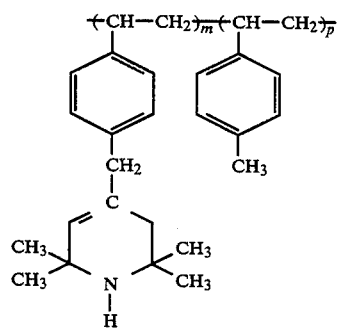

as is shown by determining the nitrogen content, and by $^1$H-NMR measurements.

The spectrum of poly-p-methylstyrene shows broad signals at δ 1.35; 1.85; 2.25 in the aliphatic region, and 6.5; 6.85 in the aromatic region.

In the copolymer's spectrum a signal at 1.1, attributed to the methyl groups of 2,2,6,6-tetramethyl-4-piperidone, is also evident.

The polymeric stabilizer so obtained can be separated from the reaction mixture by precipitation by addition of a non-solvent, such as an alcohol, e.g., methanol, with a subsequent filtration or centrifugation of the solid, and the possible washing and drying thereof.

By operating as indicated, it is possible to obtain solid polymeric stabilizers easily homogenizable by simple blending with the powders of the organic polymer which one desires to stabilize.

These solid polymeric stabilizers show, furthermore, an exceptionally high heat stability and very high characteristics of compatibility with organic polymers, especially when the organic polymer is of the same nature as the polymer containing replaceable hydrogen atoms used in the preparation of the polymeric stabilizer. Finally, the solid polymeric stabilizers of the present invention do not show any tendency to be extracted from the organic polymers in which they are incorporated, as is demonstrated in the experimental examples.

As indicated above, the solid polymeric stabilizers of the present invention can also be prepared by polymerizing vinyl-aromatic and/or dienic monomers, e.g., styrene and butadiene, in the presence of lithium-alkyls, by the technique of living polymers, so as to obtain a polymer having some hydrogen atoms replaced by metal (lithium) atoms. The metal atom-substituted polymer is subsequently reacted with the sterically hindered aminic compound which also contains an electrophilic group. Such a product can also be employed to form a stabilized composition. In the experimental section, some examples of such a procedure are reported.

The solid polymeric stabilizers of the present invention do normally have a content of active nitrogen of from 0.14 to 5.4% by weight, said content being, however, adjustable as a function of the degree of metal atoms substitution in the polymer used in the synthesis. The molecular weight of said stabilizers is preferably from about 1000 to about 50,000.

In this way, two specific requirements are taken into account, viz., the characteristics of solubility of the polymer in the stabilizer preparation step and of the performance of the stabilizer, which is best when the average molecular weight of the stabilizer is lower than that of the organic polymer which is to be stabilized.

By means of the solid polymeric stabilizers of the present invention, it is possible to stabilize many organic polymers, such as polyolefins, polydiolefins, copolymers of monoolefins and diolefins, polystyrenes, copolymers of dienes and vinyl-aromatic monomers, polyphenyleneoxides, polyphenylenesulphides, polyurethanes, polyamides and copolyamides, polyureas, polyimides and polyamide-imides, polyesters, polycarbonates, polysulphones and polyethersulphones, unsaturated polyesters, natural polymers (rubber) and in general also such compounds as lubricant oils.

Thus, according to another aspect of the invention, the present invention relates to stabilized compositions comprising an organic polymer and a stabilizing amount of the aforementioned solid polymeric stabilizers. A stabilizing amount, will be that amount which provides in the composition of an amount of active nitrogen of from 0.005 to 0.02% by weight, and preferably about 0.015% by weight. The term, active nitrogen, means the nitrogen supplied by the sterically hindered aminic group.

According to the way in which of the present invention is carried out, in these stabilized compositions the average molecular weight of the solid polymeric stabilizer is preferably lower than the average molecular weight of the organic polymer.

The stabilized polymeric compositions of the present invention can be prepared by any known technique used to homogenize an organic polymer with the stabilizing agent. In the preferred embodiment, a simple blending is carried out of the powder of the organic polymer and the powder of the solid polymeric stabilizer.

The following experimental examples are illustrative and are not to be construed as limiting the invention.

EXAMPLE 1

A 1-liter glass reaction vessel equipped with mechanical stirrer, temperature and pressure gauges, and means for the supply of the reactants and of inert gas is charged with 360 ml of cylcohexane, 10 g of poly-p-methylstyrene (weight average molecular weight $\overline{M}_w = 14,500$, number average molecular weight $\overline{M}_n = 13,500$, $\overline{M}_w/\overline{M}_n = 1.07$), and, after heating to the temperature of 60° C. and dissolving of the paramethylstyrene polymer in the solvent, 40 mmol (25 ml of 1.6M solution in hexane) of Li-n.butyl is added which has been previously reacted with about 40 mmol (4.64 g) of N,N,N',N'-tetramethylethylenediamine, by contact, for a period of about 10 minutes, at room temperature (20°–25° C.).

The reaction is carried out over about 2 hours, at 60° C. and under nitrogen atmosphere, and with the reaction mass being kept stirred. After this time period, an aliquot (about 1/10) of the reaction mixture is drawn, and is contacted with trimethylchlorosilane in order to detect the achieved degree of metal atoms substitution, which proves to be equal to about 1 metal atom per each 5 monomeric units of the p-methylstyrene polymer. To the balance of the reaction mixture is added 2,2,6,6-tetramethyl-4-piperidone in the amount of 2.6 g, i.e., in an amount stoichiometrically equivalent to the carbanionic centres produced in poly-p-methylstyrene.

The mixture is kept stirred, at the temperature of 60° C. for about 30 minutes, and methanol is then added to cause a powder-like solid to precipitate, which is separated and dried in vacuo.

The elemental analysis of this solid indicates the presence of about 1% by weight of nitrogen and, according to this data, NMR analysis confirms that about 1 unit per each 10 monomeric units composing the poly-p-methylstyrene contains the bound piperidinic function.

EXAMPLE 2

The process is carried out in a way similar to Example 1, by dissolving 10 g of polyphenyleneoxide (molecular weight about 15,000) in tetrahydrofuran, so as to form a 2% by weight polymer solution.

To this solution, Li-n.butyl is added (52 ml of 1.6M solution in cyclohexane, i.e., in an amount of about 1 mol per each monomeric unit of the polymer). The so obtained mixture is kept stirred, at the temperature of 20° C. and under nitrogen over 1 hour. 2,2,6,6-Tetramethyl-4-piperidone is then added (8.7 g. i.e., in an amount equal to 70% by mol relative to the previously charged mols of Li-n.butyl), and the mixture is kept stirred at room temperature (20°-25° C.) over some hours, under nitrogen atmosphere. To the reaction mixture methanol is then added, causing a solid in powder form to precipitate, which is separated and dried.

Upon analysis this solid shows a content at about 0.7 bound piperidinic units per each monomeric unit of polyphenyleneoxide.

EXAMPLE 3

The process is carried out in a way similar to Example 1, by dissolving 6.4 g of polyisoprene (molecular weight about 20,000) in 200 ml of cyclohexane.

About 46 mmol of Li-sec.butyl (28.8 ml of a 1.6M solution in cyclohexane) is then added, as well as 23 mmol (2.67 g) of N,N,N',N'-tetramethylethylenediamine, and the mixture is reacted with stirring, under nitrogen atmosphere, for about 4 hours, at room temperature (20°-25° C.).

10 ml of tetrahydrofuran, and subsequently 18.4 mmol (2.85 g) of 2,2,6,6-tetramethyl-4-piperidone is then added. After further reaction, under the above indicated conditions, over about 30 minutes, the solvents are evaporated off under vacuum, and a residual solid product is obtained, which, after purification by redissolution in cyclohexane and precipitation by methanol, shows a content of about 0.15 bound units of piperidone per each unit of isoprene.

EXAMPLE 4

The process is carried out in a way similar to Example 1, by dissolving 10 g of ethylene-propylene-ethylidenenorbornene terpolymer containing 5% by weight of ethylidenenorbornene in 200 ml of cyclohexane. 4.2 mmol is then added of Li-n.butyl/K-O-tert.butyl complex (1/1 by mol), and the reaction is continued over 3 hours at 70° C. The 4.2 mmol (0.65 g) of 2,2,6,6-tetramethyl-4-piperidone, is added and the reaction is continued for about 60 minutes at the temperature of 60° C.

By precipitation from methanol a rubbery solid product containing 0.54% by weight of nitrogen is separated.

EXAMPLES 5-8

The process is carried out as in Example 1, by respectively using equivalent amounts of:
(a) 3,3,5,5-tetramethylmorpholin-2-one;
(b) 1,3,3,5,5-pentamethylpiperazin-2-one;
(c) 2,2,5,5-tetramethylimidazolin-4-one;
(d) 1,3,3-trimethyldecahydroquinoxalin-2-one in lieu of the piperidone of said Example 1.

A solid is obtained, which shows on the average one nitrogenous function per each 10 monomeric units of poly-p-methylstyrene.

EXAMPLE 9

In 100 ml of cylcohexane, 5 g of styrene is submitted to polymerization with 4.8 mmol (3 ml of a 1.6M solution in cyclohexane) of Li-sec.butyl, by operating at 80° C. over 2 hours.

At the end of this time period, 4.5 mmol (0.7 g) of 2,2,6,6-tetramethyl-4-piperidone is added to the reaction mixture and the reaction is allowed to proceed over about 1 hour, at a temperature of 60° C.

By precipitation from methanol a powder-like solid product is separated, which contains an amount of nitrogen equivalent to 1 unit of piperidone per each 10 units of styrene.

EXAMPLE 10

The reactor described in Example 1 is charged with 400 ml of cyclohexane, 12 g of styrene and 1.5 mmol of Li-sec.butyl. The polymerization is carried out at 60° C. over 2 hours.

Then 28 g of butadiene and, after 2 hours at the same temperature of 60° C., 0.7 mmol of 2,6-distyrylpyridine in cyclohexanic solution are introduced into the reaction mixture.

In a few minutes (about 10 minutes) the coupling reaction is completed and the living polymer obtained is reacted with 1.4 mol of 2,2,6,6-tetramethyl-4-piperidone (0.22 g).

Approximately 30 minutes later, the polymer is coagulated, purified by dissolution in toluene and precipitation by methanol, and is dried. 40 g is obtained of a product with a content of bound stabilizer of about 0.5% by weight, which on NMR examination shows a content of styrenic units of 30% by weight, and on GPC examination shows a number average molecular weight ($M_n$) of about 65,000.

EXAMPLE 11

5 g of p-methylstyrene-octadecylvinylether copolymer of molecular weight of about 10,000 and containing 30% of p-methylstyrene is dissolved in 200 ml of anhydrous cyclohexane.

To this solution is added 13 mmol of Li-n.butyl-N,N,N',N'-tetramethylethylenediamine complex, prepared by interaction of the two components at room temperature. The reaction is carried out over 2 hours at 60° C.

5 ml is then added of anhydrous tetrahydrofuran, and some minutes later 7 mmol of 2,2,6,6-tetramethylpiperidin-4-one is added. By precipitation from methanol, a solid product is isolated which has a content of aminic compound of 13% by weight.

EXAMPLE 12

(a) The solid polymeric stabilizer obtained in Example 1 (POL-AO-1) is submitted to thermogravimetric analysis, under an atmosphere of inert gas, and with a programmed temperature (10° C./minute).

In the following Table I, the percent weight loss values for the POL-AO-1 stabilizer are reported, within different temperature ranges. These are compared to the values obtained by using the commercial stabilizers known under the tradenames TINUVIN 770 and CHIMASSORB 944.

TINUVIN 770 is a commercial product sold by CIBA-GEIGY and contains by bis(2,2,6,6-tetramethyl-4-piperidinyl)sebacate.

CHIMASSORB 944 is a commercial product sold by CIBA-GEIGY and contains a sterically hindered amine of polymeric type.

TABLE 1

| Stabilizer | $\Delta T$ 35–230° C. weight loss % | $\Delta T$ 30–280° C. weight loss % | $\Delta T \rightarrow 395°$ C. weight loss % |
|---|---|---|---|
| TINUVIN 770 | 1.3 | 20.1 | 100.0 |
| CHIMASSORB 944 | 0.3 | 0.3 | 14.5 |
| POL-AO-1 | 0.1 | 0.1 | 6.8 |

Thus, stabilizer POL-AO-1 shows comparatively high stability at high temperatures, and this characteristic renders it particularly useful as a long-term stabilizer in polymeric compositions, showing virtually no breakdown or transformation phenomena within the temperature range typically encountered by polymeric compositions during the fabrication process.

Similar stability characteristics are observed for the solid polymeric stabilizers of the other experimental Examples.

(b) The stabilizer activity of POL-AO-1 is verified on the basis of its capability to inhibit the degradation of polystyrene submitted to the action of U.V. light. The incorporation of the stabilizer in polystyrene is accomplished using equipment for powder mixing. In particular, a commercial polystyrene by Montedison Concern, having a weight average molecular weight $\bar{M}_w = 234,000$, a number average molecular weight $\bar{M}_n = 55,000$, and with $\bar{M}_w/\bar{M}_n$ ratio = 4.25, having the form of a powder, is homogenized with the powder of POL-AO-1 stabilizer, in such an amount as to produce a level of active nitrogen in the resulting composition equal to 0.015% by weight.

The resulting composition is press-moulded at 135° C., under a pressure of 900 kg/cm² for 2 minutes, a film with a thickness of 50 μm being obtained. The film extracted from the press is rapidly quenched under running water and is then submitted to accelerated ageing inside an UVCON device by ATLAS Co., with alternating cycles of irradiation by fluorescent lamps (emitting U.V. radiation in the range of from 280 to 350 nm) and of condensation in the dark, at controlled temperatures.

More particularly, in the case under examination, a cycle is imposed of irradiation of 8 hours at 60° C., and of 4 hours of condensation at 40° C.

The degradation of polystyrene is checked on the basis of the formation of carbonylic compounds (CO index), evidenced by the I.R. spectrum.

In particular, the CO index is determined as a function of the increase in absorption at 1710 cm$^{-1}$. In the present test, the increase is measured of the absorption at 1710 cm $^{-1}$ within a time interval of 100 hours for:
(1) virgin polystyrene film;
(2) polystyrene film containing stabilizer POL-AO-1;
(3) polystyrene film obtained in the previously indicated way, and containing the commercial stabilizer TINUVIN 770 in such an amount as to have an active nitrogen content of 0.015% by weight.

BRIEF DESCRIPTION OF THE DRAWING

FIG. 1 represents a graphic comparison of the permanence of the stabilizer of the invention with a commercially available prior art stabilizer.

In the case of the polystyrene film without additives (case 1), an increase in CO index of approximately 0.2 is observed, and in the other two cases no formation of carbonylic bands is observed during the time interval considered. A similar behaviour is observed with the solid polymeric stabilizers of the experimental Examples from 5 to 8.

(c) The compatibility of stabilizer POL-AO-1 with polystyrene and its permanence inside the same polymer under high thermal stress conditions are checked by measuring the steady state concentration of nitroxy radical, obtained by the oxidation of the sterically hindered aminic group of the stabilizer molecule. The measurements were made using ESR spectra directly performed on polymer samples containing the stabilizer and kept some hours at 170° C. In particular, the formation of nitroxy radicals is directly induced in the polystyrene film by photo-sensitized oxidation with oxygen singlet.

The polystyrene film is obtained as previously described.

The amount of stabilizer POL-AO-1 is equal to 2.5% by weight, corresponding to 0.015% by weight of active nitrogen. The photosensitizer (Rose Bengal, chlorophyl) is added in the amount of 0.1% by weight relative to the polymer. The film is then exposed for 18 hours to U.V. irradiation from a high-pressure 150-W mercury-vapour lamp coupled to a UV 31 filter, which secures a passing band of radiations at 290 nm. After irradiation on a weighed film portion, the test is carried out, using ESR spectra, of the formation of the radical and of its persistence in the sample at the temperature of 170° C.

The results of this test are reported in the chart of FIG. 1, wherein the ordinate is the radical concentration (as a percentage of the starting concentration), and the abscissa is the time in hours. For comparative purposes, the trend is reported for a film of the same polystyrene containing the commercial stabilizer TINUVIN 770 in an amount to give a level of active nitrogen of 0.015%.

In the FIGURE, by the (x) symbol the results of our test are shown, and by the ( • ) symbol the results of the comparative test are indicated.

A similar behaviour has been observed by using the solid polymeric stabilizers of the Examples 5 to 8.

(d) The polystyrene films, containing stabilizer POL-AO-1, obtained as previously described, are finally subjected to extraction tests, carried out at 60° C. and for 24 hours, with aqueous solutions at 2% by weight of alkaline detergents. Essentially no extraction of the stabilizer from the polymeric film has been observed.

We claim:
1. A process for the preparation of a polymeric stabilizer compound comprising:
   (a) dissolving a vinyl-aromatic polymer, aromatic ether polymer, dienic or olefinic polymer containing hydrogen atoms replaceable by metal atoms in an inert organic solvent;
   (b) replacing at least partially by metal atoms the replaceable-by-metal hydrogen atoms of said vinyl-aromatic polymer, aromatic ether polymer, dienic or olefinic polymer by reacting a metal-atoms-introducing agent selected from $C_1$–$C_{12}$ metal-alkyls, alkali metal hydrides or alkali metal amides with said vinyl-aromatic polymer, aromatic ether polymer, dienic or olefinic polymer;
   (c) reacting said vinyl-aromatic polymer, aromatic ether polymer, dienic or olefinic polymer, into which metal atoms have been so introduced, with a compound having a sterically hindered aminic function and an electrophilic function, said reaction being carried out using stoichiometric or nearly stoichiometric ratios between said compound having a sterically hindered aminic function and the carbanionic centers of said polymer into which metal atoms have been introduced, at a temperature of 0° to 150° C., for a period of 30 minutes to 6 hours, to form said polymeric stabilizer compound;
   (d) separating polymeric stabilizer compound from the reaction mixture of the preceding step, in the form of a subdivided solid.
2. A process according to claim 1, wherein in step (a) said polymer containing hydrogen atoms replaceable by metal atoms is selected from the group consisting of polymethylstyrene, poly-2,6-dimethyl-1,4-phenylene-ether, polybutadiene, polyisoprene, ethylene/propylene/diene terpolymers, styrenebutadiene copolymers and random copolymers and block copolymers of vinyl-aromatic, dienic or olefinic monomers with alkyl-vinyl-ethers, and said polymer is dissolved in an inert organic solvent selected from liquid, aliphatic cycloaliphatic or aromatic hydrocarbons, or from liquid ethers.

3. A process according to claim 1, wherein in step (b) the reaction is carried out by operating at a temperature of from 0° to 150° C., for a period of from 30 minutes to 6 hours and with an amount of from 0.1 to 1 mol of metal-atoms-introducing agent per each monomeric unit of the polymer containing the replaceable-by-metal hydrogen atoms.

4. A process according to claim 3, wherein the metal-atoms-introducing agent is a lithium-alkyl.

5. A process according to claim 3, wherein the process is carried out by operating at a temperature comprised within the range of from 40° to 80° C.

6. A process according to claim 1, wherein in step (c) a sterically hindered aminic compound is used, containing the group of 2,2,6,6-tetramethylpiperidine; of 2,2,6,6-tetramethylmorpholine; of 2,2,5,5-tetramethylpyrrolidine; of 2,2,3,5,5-pentamethylpyrrolidine; of 2,2,5,5-tetramethylimidazoline; of 1,3,3,5,5-pentamethylpiperazine, or of 1,3,3-trimethyldecahydroquinoxaline.

7. A process according to claim 6, wherein in said step (c) the aminic compound is selected among 2,2,6,6-tetramethyl-4-piperidone; 3,3,5,5-tetramethylmorpholin-2-one; 1,3,3,5,5-pentamethylpiperazin-2-one; 2,2,5,5-tetramethylimidazolin-4-one and 1,3,3-trimethyl-decahydroquinolin-2-one.

8. A process according to claim 6, wherein in said step (c) the process is carried out by operating at temperatures of the order of 40°–80° C.

9. A process according to claim 1, characterized in that in the step (d) the polymeric stabilizer compound is separated by precipitation by addition of a non-solvent.

10. A process according to claim 9, wherein said non-solvent is methanol.

11. A process for the preparation of polymeric stabilizer compounds according to claim 1, further comprising polymerizing vinylic or dienic monomers, to form said metal-atoms-containing polymer, in the presence of lithium-alkyl catalysts and the metal-atoms-containing polymer so obtained is subsequently reacted with a compound bearing sterically hindered aminic function and a carbonylic group.

12. A process according to claim 1 further comprising adding an activator to process step (b), said activator to be used in combination with said metal-atoms-introducing agent.

13. A process according to claim 12, wherein said activator is selected from among N,N,N',N'-tetramethylethylenediamine, potassium tert.butoxide and diazobicyclooctane, with a molar ratio of said metal-atoms-introducing agent to said activator comprised within the range of from 1/0.1 to 1/10.

* * * * *